(12) United States Patent
Su et al.

(10) Patent No.: US 12,279,018 B2
(45) Date of Patent: *Apr. 15, 2025

(54) BULLET-SCREEN COMMENT PROCESSING

(71) Applicant: Shanghai Bilibili Technology Co., Ltd., Shanghai (CN)

(72) Inventors: Zhenyu Su, Shanghai (CN); Bei Haoyu Yao, Shanghai (CN); Yusheng Dong, Shanghai (CN)

(73) Assignee: Shanghai Bilibili Technology Co., Ltd., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/144,959

(22) Filed: May 9, 2023

(65) Prior Publication Data

US 2023/0379548 A1 Nov. 23, 2023

(30) Foreign Application Priority Data

May 20, 2022 (CN) .......................... 202210551889.7

(51) Int. Cl.
*H04N 21/4788* (2011.01)
*G06F 40/30* (2020.01)
*H04N 21/431* (2011.01)
*H04N 21/466* (2011.01)

(52) U.S. Cl.
CPC ......... *H04N 21/4788* (2013.01); *G06F 40/30* (2020.01); *H04N 21/4312* (2013.01); *H04N 21/4665* (2013.01)

(58) Field of Classification Search
CPC ........... H04N 21/4312; H04N 21/4665; H04N 21/4788
See application file for complete search history.

(56) References Cited

U.S. PATENT DOCUMENTS

| | | | |
|---|---|---|---|
| 2014/0068692 A1* | 3/2014 | Archibong | H04N 21/6334 725/116 |
| 2022/0179665 A1* | 6/2022 | Rathod | G06F 9/451 |
| 2022/0408144 A1* | 12/2022 | Wu | H04N 21/4312 |
| 2023/0412535 A1* | 12/2023 | Wang | H04L 51/10 |

* cited by examiner

*Primary Examiner* — Rong Le
(74) *Attorney, Agent, or Firm* — McAndrews, Held & Malloy, Ltd.

(57) ABSTRACT

A bullet-screen comment processing method is provided. The method includes: receiving a first bullet-screen comment and a second bullet-screen comment; classifying the first bullet-screen comment into a first bullet-screen comment group and classifying the second bullet-screen comment into a second bullet-screen comment group based on bullet-screen comment content of the first bullet-screen comment and the second bullet-screen comment; and displaying the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

19 Claims, 7 Drawing Sheets

BULLET-SCREEN COMMENT PROCESSING

CROSS-REFERENCE TO RELATED APPLICATION

The present application claims priority to Chinese Patent Application No. 202210551889.7, filed with the China National Intellectual Property Administration on May 20, 2022, which is incorporated herein by reference in its entirety.

TECHNICAL FIELD

Embodiments of this application relate to the field of computer technologies, and in particular, to a bullet-screen comment processing method. In addition, one or more embodiments of this application relate to a computing device, and a non-transitory computer-readable storage medium.

BACKGROUND

With vigorous development of multimedia technologies, users have paid more attention to bullet-screen comments. From playback of a website video to playback of a theater chain, to a large-scale activity, bullet-screen comments already become one of important criteria to measure whether a platform has vitality of the times.

The bullet-screen comment is a comment text that floats in a video player, and the comment text is formed when a user makes a comment in a process of watching a video. Therefore, a bullet-screen comment propagation phenomenon may also be referred to as a typical group propagation case.

SUMMARY

According to a first aspect, some embodiments of this application provide a method, including:
  receiving a first bullet-screen comment and a second bullet-screen comment;
  classifying the first bullet-screen comment into a first bullet-screen comment group and classifying the second bullet-screen comment into a second bullet-screen comment group based on bullet-screen comment content of the first bullet-screen comment and the second bullet-screen comment; and
  displaying the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

According to a second aspect, some embodiments of this application provide a computing device, including:
  one or more processors; and
  a memory, storing one or more programs configured to be executed by the one or more processors, the one or more programs comprising instructions for:
  receiving a first bullet-screen comment and a second bullet-screen comment;
  classifying the first bullet-screen comment into a first bullet-screen comment group and classifying the second bullet-screen comment into a second bullet-screen comment group based on bullet-screen comment content of the first bullet-screen comment and the second bullet-screen comment; and
  displaying the first bullet-screen comment of the first bullet-screen comment group and the second bullet-screen comment of the second bullet-screen comment group by using a target bullet-screen comment track, wherein the first bullet-screen comment of the first bullet-screen comment group and the second bullet-screen comment of the second bullet-screen comment group move in the target bullet-screen comment track in opposite directions.

According to a third aspect, some embodiments of this application provides a non-transitory computer-readable storage medium. The computer-readable storage medium stores one or more programs including instructions that, when executed by one or more processors of a computing device, cause the computing device to perform operations including:
  receiving a first bullet-screen comment and a second bullet-screen comment;
  classifying the first bullet-screen comment into a first bullet-screen comment group and classifying the second bullet-screen comment into a second bullet-screen comment group based on bullet-screen comment content of the first bullet-screen comment and the second bullet-screen comment; and
  displaying the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

DETAILED DESCRIPTION OF EMBODIMENTS

Figure 1:
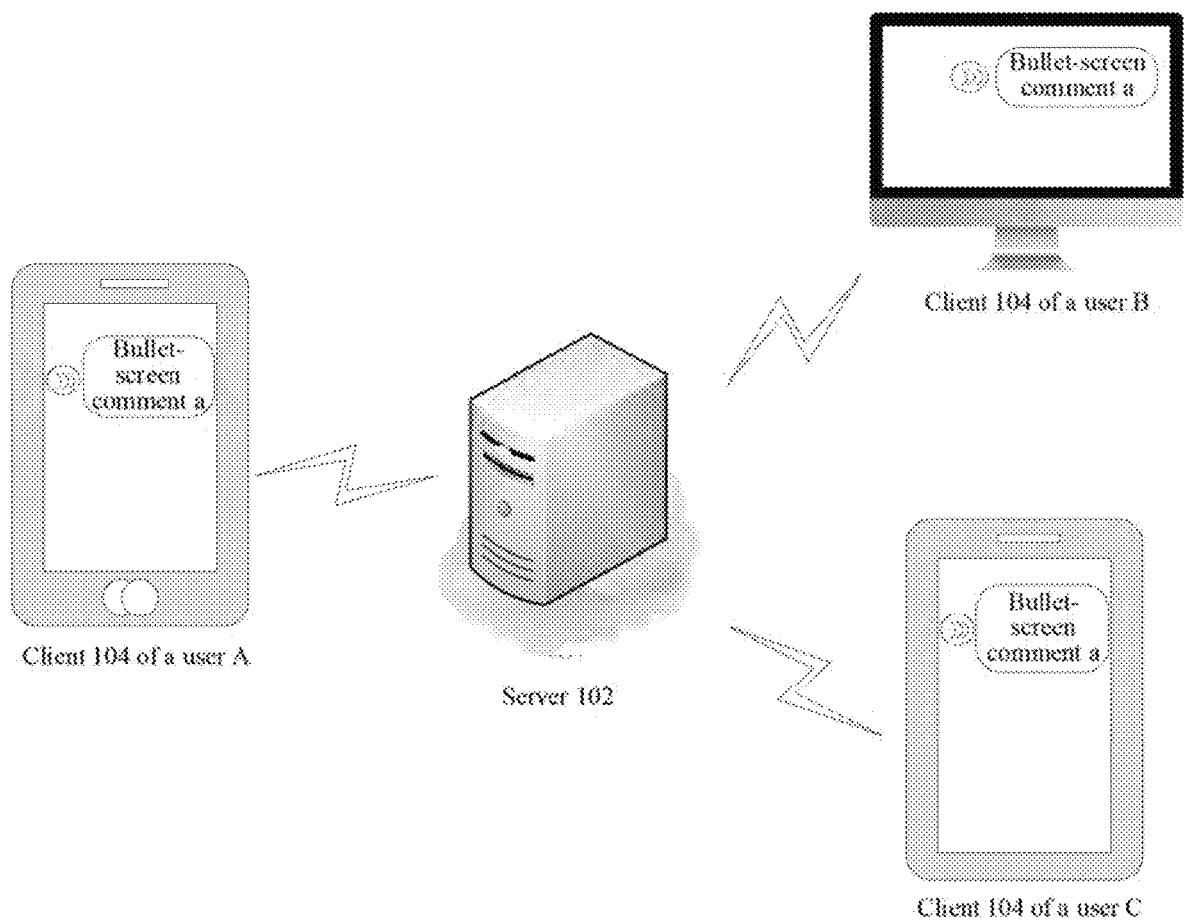
FIG. 1 is a diagram of an architecture of a bullet-screen comment processing system according to some embodiments of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" may be used in one or more embodiments of this application to describe various types of information, the information is not limited to these terms. These terms are merely used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

The inventor of the present application finds that in a video playback process, a server can obtain bullet-screen comment information published by users to a video, and then add the bullet-screen comment information to different time periods of the video. In addition, a video playback terminal displays a bullet-screen comment for the user in the video playback process in a default bullet-screen comment display manner. However, different users have different requirements for a bullet-screen comment playback effect. In this case, the system default bullet-screen comment display manner cannot meet the requirements of the different users. Therefore, this kind of problem needs to be resolved urgently by using an effective method.

A bullet-screen comment processing method and apparatus are implemented in some embodiments of this application. The bullet-screen comment processing method includes: receiving a first bullet-screen comment and a second bullet-screen comment; classifying the first bullet-screen comment into a first bullet-screen comment group and classifying the second bullet-screen comment into a second bullet-screen comment group based on bullet-screen comment content of the first bullet-screen comment and the second bullet-screen comment; and displaying the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

In the embodiments of this application, after the first bullet-screen comment and the second bullet-screen comment are received, the first bullet-screen comment and the second bullet-screen comment are respectively classified into different bullet-screen comment groups based on the bullet-screen comment content of the first bullet-screen comment and the second bullet-screen comment, and the first bullet-screen comment and the second bullet-screen comment are displayed by using the target bullet-screen comment track, where the first bullet-screen comment and the second bullet-screen comment move in the target bullet-screen comment track in the opposite directions. In this way, when the first bullet-screen comment and the second bullet-screen comment move, display manners of the bullet-screen comments in an actual display process are adjusted in this manner, thereby implementing different types of bullet-screen comment display effects. This is conducive to meeting bullet-screen comment display or watching requirements of different users, and is conducive to improving video watching experience of the users.

In this application, a bullet-screen comment processing method is provided. In addition, one or more embodiments of this application relate to a bullet-screen comment processing apparatus and a bullet-screen comment processing system, a computing device, and a computer-readable storage medium, which are described in detail one by one in the following embodiments.

In a specific implementation, a bullet-screen comment in some embodiments of this application may be presented in a client, for example, a large video playback device, a game machine, a desk computer, a smartphone, a pad, a Moving Picture Experts Group Audio Layer III (MP3) player, a Moving Picture Experts Group Audio Layer IV (MP4) player, a portable laptop computer, an ebook reader, or another display terminal.

FIG. 1 is a diagram of an architecture of a bullet-screen comment processing system according to some embodiments of this application. The bullet-screen comment processing system includes:

a server 102 and a client 104.

The server 102 is configured to: receive a first bullet-screen comment and a second bullet-screen comment; when it is determined that the first bullet-screen comment and the second bullet-screen comment include preset content, add a bullet-screen comment identifier of a target-type bullet-screen comment for each of the first bullet-screen comment and the second bullet-screen comment; and send the first bullet-screen comment and the second bullet-screen comment to the client 104.

The client 104 is configured to: receive the first bullet-screen comment and the second bullet-screen comment; classify the first bullet-screen comment into a first bullet-screen comment group and classify the second bullet-screen comment into a second bullet-screen comment group based on bullet-screen comment content of the first bullet-screen comment and the second bullet-screen comment; and display the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

Specifically, the first bullet-screen comment and the second bullet-screen comment are bullet-screen comments sent by users. The first bullet-screen comment and the second bullet-screen comment may be the bullet-screen comments sent by the users in a game process, may be the bullet-screen comments sent by the users in an audio/video or livestreaming watching process, or the like.

In some embodiments of this application, to implement a plurality of types of bullet-screen comment display effect, to meet bullet-screen comment display or watching requirements of different users, and improve game or video watching experience of the users, users that send bullet-screen comments may be specifically classified into groups. To be specific, two groups may be predetermined, for example, a group 1 and a group 2. A user may select to join any one of the groups in a game process or a livestreaming or audio/video watching process. After the user joins the group, if the user sends a bullet-screen comment, PK may be performed on the bullet-screen comment and a bullet-screen comment sent by a group member of the other group, to display PK animation of the bullet-screen comments, thereby implementing different types of bullet-screen comment display effects.

For example, if the user joins the group 1, PK may be performed on the bullet-screen comment sent by the user and a bullet-screen comment sent by a member in the group 2, and PK animation is displayed. A specific PK manner may be that the bullet-screen comment of the user and the bullet-screen comment sent by the member in the group 2 move in a same bullet-screen comment track in opposite directions, and collision animation of the bullet-screen comments is displayed when the two bullet-screen comments contact.

In addition, if the user does not join any one of the groups in the game process or the livestreaming or audio/video watching process, after the user sends the bullet-screen comment, the client may classify the bullet-screen comment into a bullet-screen comment group based on bullet-screen comment content of the bullet-screen comment.

In an actual application, the user can send the bullet-screen comment by using a user terminal. To display the bullet-screen comment on the client 104 of another user, the user terminal may send the bullet-screen comment to the server 102 after receiving the bullet-screen comment, and the server 102 sends the bullet-screen comment to the client 104 of the another user.

After receiving the bullet-screen comment, the user terminal may determine whether the user that sends the bullet-screen comment joins any group. When it is determined that the user joins a target group, a group identifier of the target group may be added to the bullet-screen comment, and then the bullet-screen comment added with the group identifier is sent to the server 102. When it is determined that the bullet-screen comment carries the group identifier, the server 102 may generate PK bullet-screen comment parameters of the bullet-screen comment by, including but not limited to, adding a mode value and a direction value. If the mode value is 1, it indicates that the bullet-screen comment is a target-type bullet-screen comment, namely, a PK bullet-screen comment. If the mode value is 0, it indicates that the bullet-screen comment is a normal bullet-screen comment. The direction value is used to indicate a movement direction of the bullet-screen comment. Then, the bullet-screen comment carrying the PK bullet-screen comment parameters may be sent to the client 104 of the another user and the user terminal (the client 104) of the user.

In addition, when it is determined that the user does not join any group, the user terminal cannot add a corresponding group identifier to the bullet-screen comment, that is, the bullet-screen comment sent by the client to the server does not carry the group identifier. In this case, the server may perform semantic recognition on the bullet-screen comment, perform group classification on the user based on a semantic recognition result, and then add a corresponding group identifier to the bullet-screen comment based on a group classification result.

For example, if the bullet-screen comment content is "group 1, fighting, fighting, fighting", semantic recognition is performed on the bullet-screen comment content, and then it can be determined, based on a semantic recognition result, that the bullet-screen comment content is a positive description related to the group 1. Therefore, it can be determined that the user is a user that joins the group 1, and a group identifier of the group 1 may be added to the bullet-screen comment. Alternatively, if the bullet-screen comment content is "group 2 will lose", semantic recognition is performed on the bullet-screen comment content, and then it is determined, based on a semantic recognition result, that the bullet-screen comment content is a negative description related to the group 2. Therefore, it can also be determined that the user may be a user that joins the group 1, and a group identifier of the group 1 may be added to the bullet-screen comment.

After receiving the bullet-screen comment, and determining that the bullet-screen comment is a PK bullet-screen comment, the client 104 may determine a target bullet-screen comment track of the bullet-screen comment, determine bullet-screen comment display parameters of the bullet-screen comment based on a display position of a bullet-screen comment of the second bullet-screen comment group in the target bullet-screen comment track, and then render and display the bullet-screen comment based on the bullet-screen comment display parameters and a preset animation display effect.

In some embodiments of this application, after the first bullet-screen comment and the second bullet-screen comment are received, the first bullet-screen comment and the second bullet-screen comment are respectively classified into different bullet-screen comment groups based on the bullet-screen comment content of the first bullet-screen comment and the second bullet-screen comment, and the first bullet-screen comment and the second bullet-screen comment are displayed by using the target bullet-screen comment track, where the first bullet-screen comment and the second bullet-screen comment move in the target bullet-screen comment track in the opposite directions. In this way, when the first bullet-screen comment and the second bullet-screen comment move, display manners of the bullet-screen comments in an actual display process are adjusted in this manner, thereby implementing different types of bullet-screen comment display effects. This is conducive to meeting bullet-screen comment display or watching requirements of different users, and is conducive to improving video watching experience of the users.

Figure 2:
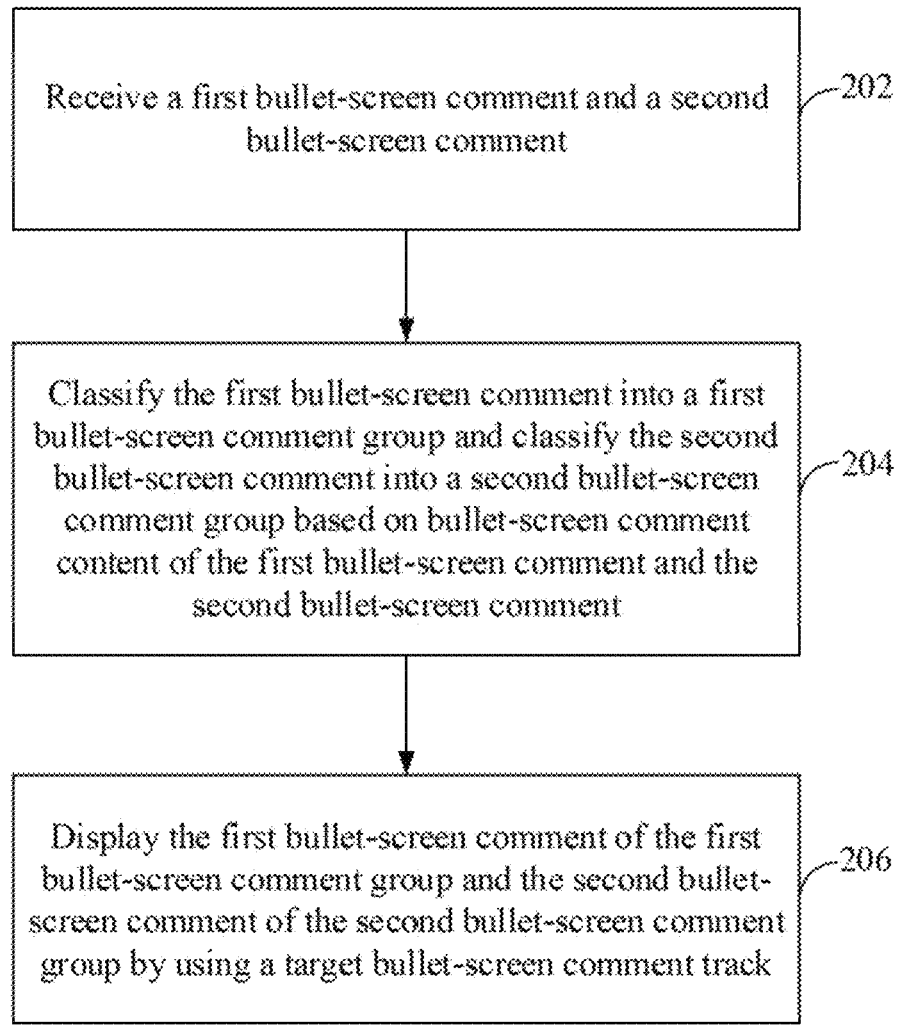
FIG. 2 is a flowchart of a first bullet-screen comment processing method according to some embodiments of this application.

FIG. 2 is a flowchart of a first bullet-screen comment processing method according to some embodiments of this application. The method includes the following steps:

Step 202: Receive a first bullet-screen comment and a second bullet-screen comment.

Specifically, the bullet-screen comment processing method provided in some embodiments of this application is applied to a client.

The first bullet-screen comment and the second bullet-screen comment are bullet-screen comments sent by users. The first bullet-screen comment or the second bullet-screen comment may be a bullet-screen comment sent by a user in a game process, may be a bullet-screen comment sent by a user in an audio/video or livestreaming watching process, or the like.

Step 204: Classify the first bullet-screen comment into a first bullet-screen comment group and classify the second bullet-screen comment into a second bullet-screen comment group based on bullet-screen comment content of the first bullet-screen comment and the second bullet-screen comment.

In some embodiments of this application, to implement a plurality of types of bullet-screen comment display effect, to meet bullet-screen comment display or watching requirements of different users, and improve game or video watching experience of the users, users that send bullet-screen comments may be specifically classified into groups. To be specific, two groups may be predetermined, for example, a group 1 and a group 2. A user may select to join any one of the groups in a game process or a livestreaming or audio/video watching process. After the user joins the group, if the user sends a bullet-screen comment, the bullet-screen comment may carry a corresponding group identifier, and PK may be performed on the bullet-screen comment and a bullet-screen comment sent by a group member of the other group, to display PK animation of the bullet-screen comments, thereby implementing different types of bullet-screen comment display effects.

For example, if the user joins the group 1, PK may be performed on the first bullet-screen comment sent by the user and the second bullet-screen comment sent by a member in the group 2, and PK animation is displayed. A specific PK manner may be that the first bullet-screen comment of the user and the second bullet-screen comment sent by the member in the group 2 move in a same bullet-screen comment track in opposite directions, and collision animation of the bullet-screen comments is displayed when the two bullet-screen comments contact.

In an actual application, the user can send the first bullet-screen comment or the second bullet-screen comment by using a user terminal. To display the first bullet-screen comment or the second bullet-screen comment on a client of another user, the user terminal may send the first bullet-screen comment or the second bullet-screen comment to a server after receiving the first bullet-screen comment or the second bullet-screen comment, and the server sends the first bullet-screen comment or the second bullet-screen comment to the client of the another user for display.

After receiving the first bullet-screen comment or the second bullet-screen comment, the user terminal may determine whether the user that sends the first bullet-screen comment or the second bullet-screen comment joins any group. When it is determined that the user joins a target group, a group identifier of the target group may be added to the first bullet-screen comment or the second bullet-screen comment, and then the bullet-screen comment added with the group identifier is sent to the server. When it is determined that the first bullet-screen comment or the second bullet-screen comment carries the group identifier, the server may generate PK bullet-screen comment parameters of the first bullet-screen comment or the second bullet-screen comment by, including but not limited to, adding a mode value and a direction value. If the mode value is 1, it indicates that the first bullet-screen comment or the second bullet-screen comment is a target-type bullet-screen comment, namely, a PK bullet-screen comment. If the mode value is 0, it indicates that the first bullet-screen comment or the second bullet-screen comment is a normal bullet-screen comment. The direction value is used to indicate a movement direction of the first bullet-screen comment or the second bullet-screen comment. Then, the bullet-screen comment carrying the PK bullet-screen comment parameters may be sent to the client of the another user and the user terminal (the client) of the user.

Alternatively, the server may alternatively match the bullet-screen comment content of the first bullet-screen comment or the second bullet-screen comment with a preset bullet-screen comment keyword, to determine whether the bullet-screen comment content semantically matches any bullet-screen comment keyword.

For example, the preset bullet-screen comment keyword may be "fighting", and the bullet-screen comment content of the first bullet-screen comment or the second bullet-screen comment is "fighting". It can be determined that the bullet-screen comment content of the first bullet-screen comment or the second bullet-screen comment matches the preset bullet-screen comment keyword "fighting". Then, when it is determined that the user joins the group 1, a new to-be-displayed bullet-screen comment may be generated based on a group identifier of the group 1 and the first bullet-screen comment or the second bullet-screen comment, and the newly generated to-be-displayed bullet-screen comment may be "group 1, fighting, fighting, fighting". When the bullet-screen comment content of the first bullet-screen comment or the second bullet-screen comment is "group 2 will lose", it is determined that the bullet-screen comment content of the first bullet-screen comment or the second bullet-screen comment does not match the preset bullet-screen comment keyword. In this case, the bullet-screen comment may be discarded.

In an actual application, if a game of the user is a team game and the game is that two teams play against each other in a game scenario, users that participate in the game are automatically divided into two camps in a game process, where users that belong to a same team belong to a same camp. Bullet-screen comments sent by the users of the two camps may be PK bullet-screen comments. That is, in a bullet-screen comment display process, PK animation of the PK bullet-screen comments of the two camps may be dynamically displayed.

Step 206: Display the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

In a specific implementation, the displaying the first bullet-screen comment of the first bullet-screen comment group and the second bullet-screen comment of the second bullet-screen comment group by using a target bullet-screen comment track includes:

determining the target bullet-screen comment track of the first bullet-screen comment of the first bullet-screen comment group and the second bullet-screen comment of the second bullet-screen comment group;

displaying the second bullet-screen comment by using the target bullet-screen comment track;

determining bullet-screen comment display parameters of the first bullet-screen comment based on a display position of the second bullet-screen comment in the target bullet-screen comment track; and rendering and displaying the first bullet-screen comment based on the bullet-screen comment display parameters and a preset animation display effect.

Specifically, the target-type bullet-screen comment may be a PK bullet-screen comment, that is, a bullet-screen comment for PK with a bullet-screen comment sent by a group member of another group.

Usually, after the user sends the bullet-screen comment, the bullet-screen comment is moved and displayed in a bullet-screen comment track of the client based on a preset movement direction and a preset movement speed. However, when it is determined that the first bullet-screen comment or the second bullet-screen comment is a PK bullet-screen comment, to perform PK on the first bullet-screen comment or the second bullet-screen comment and the bullet-screen comment sent by the group member of the another group, to display PK animation of the two bullet-screen comments, the two bullet-screen comments need to be displayed in a same bullet-screen comment track and move in opposite directions. In this case, when it is detected that a distance between the first bullet-screen comment of the first bullet-screen comment group and the second bullet-screen comment of the second bullet-screen comment group in the target bullet-screen comment track is less than a preset distance threshold, the first bullet-screen comment and/or the second bullet-screen comment is rendered and displayed based on the preset animation display effect.

Specifically, if the distance between the two bullet-screen comments is equal to 0 when the bullet-screen comments move, the two bullet-screen comments collide with each other, and then PK animation may be displayed.

Therefore, after the client receives the first bullet-screen comment or the second bullet-screen comment, if it is determined that the first bullet-screen comment or the second bullet-screen comment is a PK bullet-screen comment, the target bullet-screen comment track of the first bullet-screen comment or the second bullet-screen comment can be determined, and the bullet-screen comment sent by the group member of the another group can be displayed in the target bullet-screen comment track, thereby implementing a subsequent bullet-screen comment PK process in a manner of displaying the bullet-screen comments in the target bullet-screen comment track.

In a specific implementation, the determining the target bullet-screen comment track of the first bullet-screen comment of the first bullet-screen comment group and the second bullet-screen comment of the second bullet-screen comment group includes:

determining bullet-screen comment tracks that do not display a target-type bullet-screen comment of the first bullet-screen comment group;

determining any bullet-screen comment track that is in the bullet-screen comment tracks and that displays a target-type bullet-screen comment of the second bullet-screen comment group as the target bullet-screen comment track of the first bullet-screen comment of the first bullet-screen comment group;

determining bullet-screen comment tracks that do not display the target-type bullet-screen comment of the second bullet-screen comment group; and determining any one of the bullet-screen comment tracks as the target bullet-screen comment track of the second bullet-screen comment of the second bullet-screen comment group; or determining any one of the bullet-screen comment tracks as the target bullet-screen comment track of the first bullet-screen comment of the first bullet-screen comment group or the second bullet-screen comment of the second bullet-screen comment group.

Specifically, when the target bullet-screen comment track of the first bullet-screen comment is determined, if a target PK bullet-screen comment that is of the first bullet-screen comment group and that is sent by another user is displayed in the bullet-screen comment track, PK is first performed on the target PK bullet-screen comment and the bullet-screen comment sent by the group member of the another group. If the first bullet-screen comment is still displayed in the bullet-screen comment track, a subsequent bullet-screen comment PK process may not be implemented for the first bullet-screen comment.

Therefore, when the target bullet-screen comment track of the first bullet-screen comment is determined, it should be first ensured that the target bullet-screen comment track does not display the bullet-screen comment of the first bullet-screen comment group. To be specific, the bullet-screen comment tracks that do not display the PK bullet-screen comment of the first bullet-screen comment group are first determined, and then any bullet-screen comment track that displays the PK bullet-screen comment (the second bullet-screen comment) of the second bullet-screen comment group and that is in the bullet-screen comment tracks that do not display the PK bullet-screen comment of the first bullet-screen comment group is determined as the target bullet-screen comment track of the first bullet-screen comment. Similarly, when the target bullet-screen comment track of the second bullet-screen comment is determined, it should be first ensured that the target bullet-screen comment track is a bullet-screen comment track that does not display the second bullet-screen comment of the second bullet-screen comment group, and then any bullet-screen comment track that displays the first bullet-screen comment of the first bullet-screen comment group and that is in the bullet-screen comment tracks that do not display the second bullet-screen comment of the second bullet-screen comment group is determined as the target bullet-screen comment track of the second bullet-screen comment.

Alternatively, when all the bullet-screen comment tracks that do not display the PK bullet-screen comment of the first bullet-screen comment group do not display the PK bullet-screen comment of the second bullet-screen comment group, any one of the bullet-screen comment tracks that do not display the PK bullet-screen comment of the rust bullet-screen comment group may be determined as the target bullet-screen comment track of the first bullet-screen comment. Similarly, when all the bullet-screen comment tracks that do not display the PK bullet-screen comment of the first bullet-screen comment group do not display the PK bullet-screen comment of the second bullet-screen comment group, any one of the bullet-screen comment tracks that do not display the PK bullet-screen comment of the second bullet-screen comment group may be determined as the target bullet-screen comment track of the second bullet-screen comment.

Alternatively, a safe area may be set in a bullet-screen comment display area of the client, and PK animation is not displayed in the safe area. Therefore, when the target bullet-screen comment track of the first bullet-screen comment is selected, if it is determined that the second bullet-screen comment exists in a safe area of a specific bullet-screen comment track, the bullet-screen comment track is eliminated. In other words, the bullet-screen comment track cannot be used as the target bullet-screen comment track. After the second bullet-screen comment is removed from the safe area, the bullet-screen comment track can be used as the target bullet-screen comment track.

In addition, the bullet-screen comment display parameters include but are not limited to an acceleration movement time point and a bullet-screen comment collision time point.

To implement different types of bullet-screen comment display effects, in some embodiments of this application, when the PK animation of the two bullet-screen comments in the same bullet-screen comment track is displayed, the two bullet-screen comments may be accelerated and displayed when the distance between the two bullet-screen comments in the same bullet-screen comment track meets a specific distance threshold, and then the PK animation of the two bullet-screen comments is displayed when the two bullet-screen comments collide with each other.

Therefore, in some embodiments of this application, after the target bullet-screen comment track of the first bullet-screen comment or the second bullet-screen comment is determined, it is determined that the first bullet-screen comment or the second bullet-screen comment is displayed in the target bullet-screen comment track, and a display position of the first bullet-screen comment or the second bullet-screen comment is a start position (a start position on a leftmost side or a rightmost side in a screen) of the target bullet-screen comment track. Based on this, in some embodiments of this application, the bullet-screen comment display parameters of the first bullet-screen comment, such as the acceleration movement time point and the bullet-screen comment collision time point, may be determined based on the display position of the second bullet-screen comment of the second bullet-screen comment group in the target bullet-screen comment track.

In addition, when the second bullet-screen comment of the second bullet-screen comment group exists in the target bullet-screen comment track, after the bullet-screen comment display parameters of the first bullet-screen comment are determined, the bullet-screen comment display parameters may be added to the second bullet-screen comment of the second bullet-screen comment group. In this way, when the acceleration movement time point is reached, the first bullet-screen comment and the second bullet-screen comment of the second bullet-screen comment group can be simultaneously accelerated to move in the target bullet-screen comment track; and when it is detected that the bullet-screen comment collision time point is reached, the first bullet-screen comment and the second bullet-screen comment of the second bullet-screen comment group can simultaneously stop moving in the target bullet-screen comment track, and PK collision animation is simultaneously displayed.

In a specific implementation, when the bullet-screen comment display parameters include the acceleration movement time point, the determining bullet-screen comment display parameters of the first bullet-screen comment based on a display position of the second bullet-screen comment in the target bullet-screen comment track includes:
  determining a distance between the first bullet-screen comment and the second bullet-screen comment based on the display position of the second bullet-screen comment in the target bullet-screen comment track and an initial position of the first bullet-screen comment; and
  determining the acceleration movement time point of the first bullet-screen comment based on an initial movement speed of the first bullet-screen comment, the distance, and a preset acceleration movement distance.

Specifically, as described above, to implement different types of bullet-screen comment display effects, in some embodiments of this application, when the PK animation of the two bullet-screen comments in the same bullet-screen comment track is displayed, the two bullet-screen comments may be accelerated and displayed when the distance between the two bullet-screen comments in the same bullet-screen comment track meets the specific distance threshold. Therefore, before the first bullet-screen comment is displayed, the distance between the first bullet-screen comment and the second bullet-screen comment of the second bullet-screen comment group may be first determined based on the display position of the second bullet-screen comment of the second bullet-screen comment group in the target bullet-screen comment track and the initial position of the first bullet-screen comment, and then the acceleration movement time point of the first bullet-screen comment is determined based on the initial movement speed of the first bullet-screen comment, the distance, and the preset acceleration movement distance.

Before the first bullet-screen comment and the second bullet-screen comment of the second bullet-screen comment group are accelerated and moved, both the first bullet-screen comment and the second bullet-screen comment of the second bullet-screen comment group are moved and displayed in the target bullet-screen comment track based on the initial movement speed. In addition, the preset acceleration movement distance indicates that the first bullet-screen comment and the second bullet-screen comment of the second bullet-screen comment group are moved and displayed within the distance range based on an accelerated speed. The preset acceleration movement distance may be set based on an actual requirement, and is not limited herein. The acceleration movement time point indicates that movement and display of the first bullet-screen comment based on the accelerated speed starts from the time point.

Figure 3:
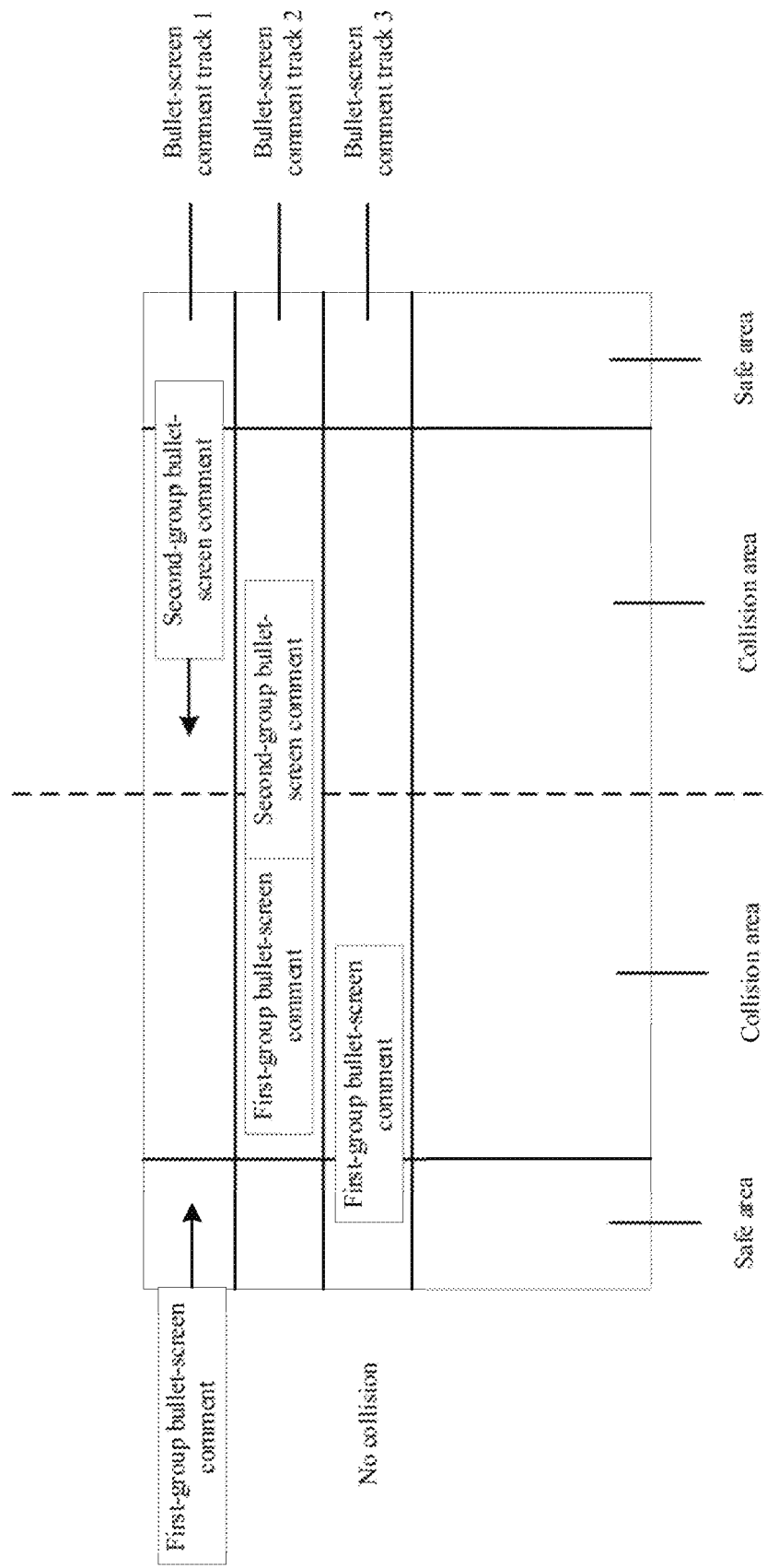
FIG. 3 is a schematic diagram of a bullet-screen comment display result according to some embodiments of this application.

FIG. 3 is a schematic diagram of a bullet-screen comment display result according to some embodiments of this application. In FIG. 3, a first-group bullet-screen comment is the first bullet-screen comment, and a second-group bullet-screen comment is the second bullet-screen comment of the second bullet-screen comment group. A position of the first-group bullet-screen comment in a bullet-screen comment track 1 is the initial position of the first bullet-screen comment, and a position of the second-group bullet-screen comment in the bullet-screen comment track 1 is a display position of the second-group bullet-screen comment. This indicates that the second-group bullet-screen comment already moves by a specific distance in the bullet-screen comment track 1, and the first bullet-screen comment does not start to move. Therefore, a distance between the display position of the second-group bullet-screen comment and a start position on a left side of the bullet-screen comment track is the distance between the first bullet-screen comment and the second bullet-screen comment of the second bullet-screen comment group.

Therefore, after the distance L1 between the first bullet-screen comment and the second bullet-screen comment of the second bullet-screen comment group, the preset acceleration movement distance L2, and the initial movement speed v0 of the first bullet-screen comment are determined, the acceleration movement time point t1 of the first bullet-screen comment can be determined based on Formula (1).

$$t1 = \frac{1}{2}(L1-L2)/v0 \qquad \text{Formula (1)}$$

Further, after the distance between the first bullet-screen comment and the second bullet-screen comment is determined, the method further includes:
  determining whether the distance is less than or equal to a preset distance threshold; and
  if the distance is not less than or equal to the preset distance threshold, determining the acceleration movement time point of the first bullet-screen comment based on the initial movement speed of the first bullet-screen comment, the distance, and the preset acceleration movement distance.

Specifically, as shown in FIG. 3, a safe area may be set in the bullet-screen comment display area of the client, and PK animation is not displayed in the safe area.

Therefore, a length of the safe area in a horizontal direction may be determined as the preset distance threshold. When it is determined that the distance between the first bullet-screen comment and the second bullet-screen comment of the second bullet-screen comment group is less than or equal to the preset distance threshold, it indicates that the second bullet-screen comment of the second bullet-screen comment group already moves to the safe area on the left side of the screen before the first bullet-screen comment is displayed. In this case, a bullet-screen comment collision effect (PK animation) is not displayed, and display of the first bullet-screen comment may be delayed. When it is determined that the distance between the first bullet-screen comment and the second bullet-screen comment of the second bullet-screen comment group is greater than the preset distance threshold, the foregoing process of determining the acceleration movement time point of the first bullet-screen comment based on the initial movement speed of the first bullet-screen comment, the distance, and the preset acceleration movement distance may be continued.

In some embodiments of this application, the acceleration movement time point of the first bullet-screen comment is determined, to adjust a movement speed of the first bullet-screen comment in an actual display process based on the acceleration movement time point, thereby implementing different types of bullet-screen comment display effects. This is conducive to meeting bullet-screen comment display or watching requirements of different users, and is conducive to improving video watching experience of the users.

In addition, when the bullet-screen comment display parameters include the bullet-screen comment collision time point, the determining bullet-screen comment display parameters of the first bullet-screen comment based on a display position of the second bullet-screen comment in the target bullet-screen comment track includes:

determining acceleration movement duration of the first bullet-screen comment based on the preset acceleration movement distance and a target movement speed corresponding to acceleration movement; and determining the bullet-screen comment collision time point of the first bullet-screen comment and the second bullet-screen comment based on the acceleration movement time point and the acceleration movement duration.

Specifically, after the target movement speed v1 of the first bullet-screen comment is determined, the bullet-screen comment collision time point t2 of the first bullet-screen comment can be determined based on Formula (2).

$$t2 = \frac{1}{2}L2/v1 + t1 \quad \text{Formula (2)}$$

In this way, the first bullet-screen comment is rendered and displayed based on the preset animation display effect when it is determined that the time point is reached.

In some embodiments of this application, the bullet-screen comment collision time point of the first bullet-screen comment is determined, to adjust a display effect of the first bullet-screen comment when it is determined that the bullet-screen comment collision time point is reached, thereby implementing different types of bullet-screen comment display effects. This is conducive to meeting bullet-screen comment display or watching requirements of different users, and is conducive to improving video watching experience of the users.

Specifically, after bullet-screen comment display parameters of a to-be-displayed bullet-screen comment are determined, the to-be-displayed bullet-screen comment is rendered and displayed based on the bullet-screen comment display parameters and the preset animation display effect.

In an actual application, when it is detected that the distance between the first bullet-screen comment and the second bullet-screen comment is less than the preset distance threshold, the first bullet-screen comment and/or the second bullet-screen comment is rendered and displayed based on the preset animation display effect.

Specifically, when the second bullet-screen comment of the second bullet-screen comment group exists in the target bullet-screen comment track, after the bullet-screen comment display parameters of the first bullet-screen comment are determined, the bullet-screen comment display parameters may be added to the second bullet-screen comment of the second bullet-screen comment group. In this way, when the acceleration movement time point is reached or when the distance between the first bullet-screen comment and the second bullet-screen comment is less than the preset distance threshold, the first bullet-screen comment and the second bullet-screen comment of the second bullet-screen comment group can be simultaneously accelerated to move in the target bullet-screen comment track; and when it is detected that the bullet-screen comment collision time point is reached, the first bullet-screen comment and the second bullet-screen comment of the second bullet-screen comment group can simultaneously stop moving in the target bullet-screen comment track, and PK collision animation is simultaneously displayed.

Alternatively, the first bullet-screen comment may alternatively be displayed based on the initial movement speed, and when it is detected that the acceleration movement time point is reached, the first bullet-screen comment is displayed based on the target movement speed.

When it is detected that the bullet-screen comment collision time point is reached, the first bullet-screen comment is rendered and displayed based on the preset animation display effect, where the first bullet-screen comment and the second bullet-screen comment of the second bullet-screen comment group move in the target bullet-screen comment track in the opposite directions.

Specifically, when the bullet-screen comment display parameters include the acceleration movement time point and the bullet-screen comment collision time point, the first bullet-screen comment may be first moved and displayed in the target bullet-screen comment track based on the initial movement speed, then whether the acceleration movement time point is reached is continuously detected when the to-be-displayed bullet-screen comment moves, and when it is detected that the acceleration movement time point is reached, the first bullet-screen comment can be moved and displayed in the target bullet-screen comment track based on an accelerated movement speed, namely, the target movement speed.

In the process of moving and displaying the first bullet-screen comment based on the target movement speed, whether the bullet-screen comment collision time point is reached may be continuously detected, and when it is determined that the bullet-screen comment collision time point is reached, the first bullet-screen comment and the second bullet-screen comment of the second bullet-screen comment group in the target bullet-screen comment track are rendered and displayed based on the preset animation display effect.

The preset animation display effect may be PK animation, explosion animation, or the like. When colliding with each other, both the first bullet-screen comment and the second bullet-screen comment of the second bullet-screen comment group stop moving in the target bullet-screen comment track and perform PK. PK animation may be displayed within a time period from starting PK to ending PK. After PK ends and a PK result is determined, a winning PK animation effect, for example, fireworks special effect animation, may be displayed at a PK winner, and bullet-screen comment explosion animation of a PK loser may be further displayed. After the bullet-screen comment explosion animation is displayed for specific duration, for example, after 2 s, the bullet-screen comment of the PK loser disappears from the target bullet-screen comment track. In this case, the target bullet-screen comment track displays only the bullet-screen comment of the PK winner.

In some embodiments of this application, a display manner of the first bullet-screen comment in the actual display process is adjusted based on the bullet-screen comment display parameters, thereby implementing different types of bullet-screen comment display effects. This is conducive to meeting bullet-screen comment display or watching requirements of different users, and is conducive to improving audio/video watching experience or game experience of the users.

In addition, a first display time point of the first bullet-screen comment and a second display time point of the second bullet-screen comment in the target bullet-screen comment track may be further determined.

The first bullet-screen comment is rendered and displayed based on the bullet-screen comment display parameters.

When it is detected that the bullet-screen comment collision time point is reached and it is determined that a first display time point is earlier than a second display time point, the second bullet-screen comment is rendered and displayed based on the preset animation display effect.

When it is detected that a display end time of the second bullet-screen comment is reached, the first bullet-screen comment is rendered and displayed based on the initial movement speed.

Specifically, a display time point of a bullet-screen comment in the target bullet-screen comment track is used to indicate that display of the bullet-screen comment in the target bullet-screen comment track starts from the time point.

In some embodiments of this application, the PK result of the first bullet-screen comment and the second bullet-screen comment of the second bullet-screen comment group in the target bullet-screen comment track is determined based on a sequence of display time points of different bullet-screen comments in the target bullet-screen comment track. If the first display time point of the first bullet-screen comment is earlier than the second display time point of the second bullet-screen comment of the second bullet-screen comment group, it can be determined that the PK result of the first bullet-screen comment and the second bullet-screen comment of the second bullet-screen comment group is that the first bullet-screen comment wins PK. If the first display time point of the first bullet-screen comment is later than the second display time point of the second bullet-screen comment of the second bullet-screen comment group, it can be determined that the PK result of the first bullet-screen comment and the second bullet-screen comment of the second bullet-screen comment group is that the second bullet-screen comment of the second bullet-screen comment group wins PK. Then, a corresponding animation display effect may be selected based on the PK result, to perform bullet-screen comment display.

In addition, when the bullet-screen comment display parameters include the acceleration movement time point and the bullet-screen comment collision time point, the first bullet-screen comment and the second bullet-screen comment of the second bullet-screen comment group may be first moved and displayed in the target bullet-screen comment track based on the initial movement speed, then whether the acceleration movement time point is reached is continuously detected when the bullet-screen comments move, and when it is detected that the acceleration movement time point is reached, the first bullet-screen comment and the second bullet-screen comment of the second bullet-screen comment group can be moved and displayed in the target bullet-screen comment track based on the accelerated movement speed, namely, the target movement speed.

In the process of moving the first bullet-screen comment based on the target movement speed, whether the bullet-screen comment collision time point is reached may be continuously detected, and both the first bullet-screen comment and the bullet-screen comment of the second bullet-screen comment group stop moving and perform PK when it is determined that the bullet-screen comment collision time point is reached. PK animation may be displayed within the time period from starting PK to ending PK, and then the PK result of the first bullet-screen comment and the second bullet-screen comment of the second bullet-screen comment group may be determined based on the sequence of the display time points of the bullet-screen comments in the target bullet-screen comment track.

In an actual application, if the first bullet-screen comment is a PK winner, a winning PK animation effect, for example, fireworks special effect animation, may be displayed in an area in which the first bullet-screen comment is located, and bullet-screen comment explosion animation of the PK loser (the second bullet-screen comment of the second bullet-screen comment group) may be further displayed. After the bullet-screen comment explosion animation is displayed for specific duration, for example, after 2 s, the bullet-screen comment of the PK loser disappears from the target bullet-screen comment track, and then the target bullet-screen comment track may continue to display the first bullet-screen comment based on the initial movement speed.

In addition, after the first bullet-screen comment and the second bullet-screen comment are received, the method further includes:

determining whether there is a bullet-screen comment track that does not display a target-type bullet-screen comment of the first bullet-screen comment group or a target-type bullet-screen comment of the second bullet-screen comment group; and if there is no bullet-screen comment track that does not display a target-type bullet-screen comment of the first bullet-screen comment group or a target-type bullet-screen comment of the second bullet-screen comment group, when it is determined that the first bullet-screen comment and/or the second bullet-screen comment belongs to a target display type, adding the first bullet-screen comment and/or the second bullet-screen comment to a waiting queue corresponding to the target display type.

Specifically, the target display type is a host-state bullet-screen comment type. If the bullet-screen comment sent by the user belongs to the host-state bullet-screen comment type, it indicates that the bullet-screen comment is displayed on only the client of the user that sends the bullet-screen comment without being displayed on a client of another user. Therefore, after receiving the bullet-screen comment that is returned by the server and that carries the group identifier, the client that sends the bullet-screen comment determines the bullet-screen comment as a PK bullet-screen comment, and then may determine whether there is an idle bullet-screen comment track, that is, determine whether there is a bullet-screen comment track that does not display the PK bullet-screen comment of the first bullet-screen comment group or whether there is a bullet-screen comment track that does not display the PK bullet-screen comment of the second bullet-screen comment group. If a determining result is negative, whether the first bullet-screen comment or the second bullet-screen comment belongs to the host-state bullet-screen comment type needs to be determined, that is, whether the first bullet-screen comment or the second bullet-screen comment is a host-state bullet-screen comment is determined. When it is determined that the first bullet-screen comment or the second bullet-screen comment is a host-state bullet-screen comment, the first bullet-screen comment or the second bullet-screen comment needs to be added to a host-state bullet-screen comment waiting queue. In this way, when it is determined that there is an idle bullet-screen comment track, the host-state bullet-screen comment is displayed in the idle bullet-screen comment track. When it is determined that the bullet-screen comment is not a host-state bullet-screen comment, the bullet-screen comment may be discarded.

Further, whether the waiting queue is empty is determined when it is determined that there is a bullet-screen comment track that does not display the target-type bullet-screen comment of the first bullet-screen comment group.

If the waiting queue is not empty, the first bullet-screen comment in the waiting queue is added to the bullet-screen comment track for display.

Specifically, when the client determines that there is an idle bullet-screen comment track, that is, when there is a bullet-screen comment track that does not display the PK bullet-screen comment of the first bullet-screen comment group, whether the host-state bullet-screen comment waiting queue is empty can be determined. Specifically, whether there is a to-be-displayed host-state bullet-screen comment is determined, and then, when it is determined that there is a to-be-displayed host-state bullet-screen comment in the host-state bullet-screen comment waiting queue, each to-be-displayed host-state bullet-screen comment may be sequentially added, based on a sequence of the to-be-displayed host-state bullet-screen comments in the waiting queue, to the idle bullet-screen comment track for display.

In some embodiments of this application, when it is determined that the first bullet-screen comment is a host-state bullet-screen comment, and when the user terminal that sends the first bullet-screen comment determines that there is no idle bullet-screen comment track, the first bullet-screen comment may be first added to the host-state bullet-screen comment waiting queue without being directly discarded. In this way, when there is an idle bullet-screen comment track, the host-state bullet-screen comment is displayed. This is conducive to meeting bullet-screen comment display or watching requirements of different users, and is conducive to improving audio/video watching experience or game experience of the users.

A bullet-screen comment processing method is implemented in some embodiments of this application. The bullet-screen comment processing method includes: receiving a first bullet-screen comment and a second bullet-screen comment; classifying the first bullet-screen comment into a first bullet-screen comment group and classifying the second bullet-screen comment into a second bullet-screen comment group based on bullet-screen comment content of the first bullet-screen comment and the second bullet-screen comment: and displaying the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

In some embodiments of this application, after the first bullet-screen comment and the second bullet-screen comment are received, the first bullet-screen comment and the second bullet-screen comment may be displayed in the same target bullet-screen comment track. However, the first bullet-screen comment and the second bullet-screen comment move in the target bullet-screen comment track in the opposite directions. In this way, when the first bullet-screen comment and the second bullet-screen comment move, if a distance between the first bullet-screen comment and the second bullet-screen comment is less than a preset distance threshold, the first bullet-screen comment and the second bullet-screen comment may be rendered and displayed based on a preset animation display effect. The preset animation display effect may be PK animation, bullet-screen comment explosion animation of a PK loser after a PK result is obtained, and the like. A display manner of the bullet-screen comment in an actual display process is adjusted in this manner, thereby implementing different types of bullet-screen comment display effects. This is conducive to meeting bullet-screen comment display or watching requirements of different users, and is conducive to improving video watching experience of the users.

Figure 4:
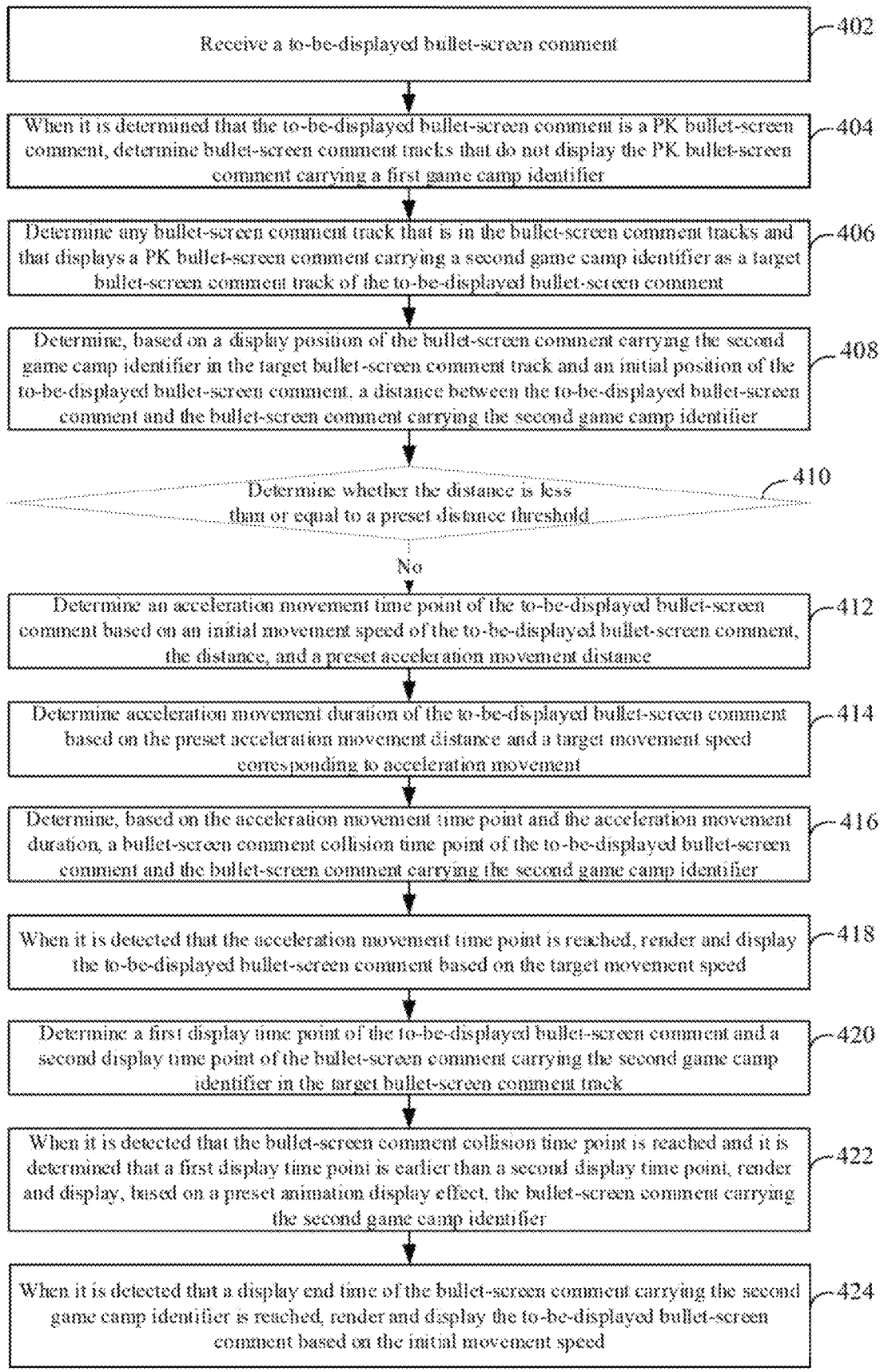
FIG. 4 is a flowchart of a processing process of a bullet-screen comment processing method applied to the field of games according to some embodiments of this application.

Refer to FIG. 4. An application of the bullet-screen comment processing method provided in embodiments of this application to bullet-screen comment processing in the field of games is used as an example, to further describe the bullet-screen comment processing method. FIG. 4 is a flowchart of a processing process of a bullet-screen comment processing method applied to the field of games according to some embodiments of this application. The method specifically includes the following steps:

Step 402: Receive a to-be-displayed bullet-screen comment.

Step 404: When it is determined that the to-be-displayed bullet-screen comment is a PK bullet-screen comment, determine bullet-screen comment tracks that do not display the PK bullet-screen comment carrying a first game camp identifier.

Step 406: Determine any bullet-screen comment track that is in the bullet-screen comment tracks and that displays a PK bullet-screen comment carrying a second game camp identifier as a target bullet-screen comment track of the to-be-displayed bullet-screen comment.

In an actual application, any of the bullet-screen comment tracks may alternatively be determined as the target bullet-screen comment track of the to-be-displayed bullet-screen comment.

Step 408: Determine, based on a display position of the bullet-screen comment carrying the second game camp identifier in the target bullet-screen comment track and an initial position of the to-be-displayed bullet-screen comment, a distance between the to-be-displayed bullet-screen comment and the bullet-screen comment carrying the second game camp identifier.

Step 410: Determine whether the distance is less than or equal to a preset distance threshold.

If the distance is not less than or equal to the preset distance threshold, step 412 is performed. If the distance is less than or equal to the preset distance threshold, the to-be-displayed bullet-screen comment is rendered and displayed based on an initial movement speed.

Step 412: Determine an acceleration movement time point of the to-be-displayed bullet-screen comment based on the initial movement speed of the to-be-displayed bullet-screen comment, the distance, and a preset acceleration movement distance.

Step 414: Determine acceleration movement duration of the to-be-displayed bullet-screen comment based on the preset acceleration movement distance and a target movement speed corresponding to acceleration movement.

Step 416: Determine, based on the acceleration movement time point and the acceleration movement duration, a bullet-screen comment collision time point of the to-be-displayed bullet-screen comment and the bullet-screen comment carrying the second game camp identifier.

Step 418: When it is detected that the acceleration movement time point is reached, render and display the to-be-displayed bullet-screen comment based on the target movement speed, where the to-be-displayed bullet-screen comment and the bullet-screen comment carrying the second game camp identifier move in the target bullet-screen comment track in opposite directions.

Step 420: Determine a first display time point of the to-be-displayed bullet-screen comment and a second display time point of the bullet-screen comment carrying the second game camp identifier in the target bullet-screen comment track.

Step 422: When it is detected that the bullet-screen comment collision time point is reached and it is determined that a first display time point is earlier than a second display time point, render and display, based on a preset animation display effect, the bullet-screen comment carrying the second game camp identifier.

Step 424: When it is detected that a display end time of the bullet-screen comment carrying the second game camp identifier is reached, render and display the to-be-displayed bullet-screen comment based on the initial movement speed.

In some embodiments of this application, the target bullet-screen comment track of the to-be-displayed bullet-screen comment is determined based on the first game camp identifier carried in the to-be-displayed bullet-screen comment. When the bullet-screen comment carrying the second game camp identifier is displayed in the target bullet-screen comment track, the to-be-displayed bullet-screen comment and the bullet-screen comment carrying the second game camp identifier may be displayed in the same target bullet-screen comment track. Therefore, before the to-be-displayed bullet-screen comment is displayed, bullet-screen comment display parameters of the to-be-displayed bullet-screen comment may be first determined based on the display position of the bullet-screen comment carrying the second game camp identifier in the target bullet-screen comment track, to adjust a display manner of the to-be-displayed bullet-screen comment in an actual display process based on the bullet-screen comment display parameters, thereby implementing different types of bullet-screen comment display effects. This is conducive to meeting bullet-screen comment display or watching requirements of different users, and is conducive to improving video watching experience of the users.

Figure 5:
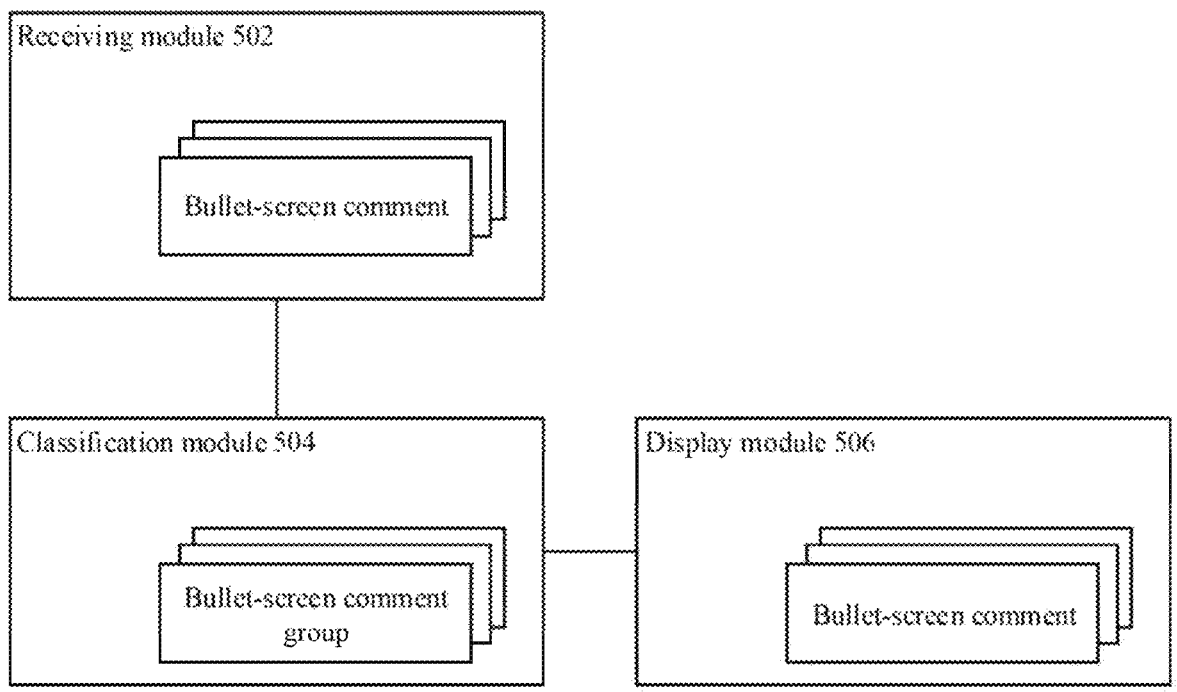
FIG. 5 is a schematic diagram of a structure of a first bullet-screen comment processing apparatus according to some embodiments of this application.

This application further provides a bullet-screen comment processing apparatus embodiment corresponding to the foregoing method embodiments. FIG. 5 is a schematic diagram of a structure of a first bullet-screen comment processing apparatus according to some embodiments of this application. As shown in FIG. 5, the apparatus includes:

a receiving module 502, configured to receive a first bullet-screen comment and a second bullet-screen comment;

a classification module 504, configured to classify the first bullet-screen comment into a first bullet-screen comment group and classify the second bullet-screen comment into a second bullet-screen comment group based on bullet-screen comment content of the first bullet-screen comment and the second bullet-screen comment; and a display module 506, configured to display the first bullet-screen comment of the first bullet-screen comment group and the second bullet-screen comment of the second bullet-screen comment group by using a target bullet-screen comment track, where the first bullet-screen comment of the first bullet-screen comment group and the second bullet-screen comment of the second bullet-screen comment group move in the target bullet-screen comment track in opposite directions.

In some embodiments, the bullet-screen comment processing apparatus further includes a rendering module, configured to:
when it is detected that a distance between the first bullet-screen comment of the first bullet-screen comment group and the second bullet-screen comment of the second bullet-screen comment group in the target bullet-screen comment track is less than a preset distance threshold, render and display the first bullet-screen comment and/or the second bullet-screen comment based on a preset animation display effect.

In some embodiments, the display module 506 is further configured to:
determine the target bullet-screen comment track of the first bullet-screen comment of the first bullet-screen comment group and the second bullet-screen comment of the second bullet-screen comment group;
display the second bullet-screen comment by using the target bullet-screen comment track;
determine bullet-screen comment display parameters of the first bullet-screen comment based on a display position of the second bullet-screen comment in the target bullet-screen comment track; and
render and display the first bullet-screen comment based on the bullet-screen comment display parameters and a preset animation display effect.

In some embodiments, the display module 506 is further configured to:
determine bullet-screen comment tracks that do not display a target-type bullet-screen comment of the first bullet-screen comment group;
determine any bullet-screen comment track that is in the bullet-screen comment tracks and that displays a target-type bullet-screen comment of the second bullet-screen comment group as the target bullet-screen comment track of the first bullet-screen comment of the first bullet-screen comment group;
determine bullet-screen comment tracks that do not display the target-type bullet-screen comment of the second bullet-screen comment group; and
determine any one of the bullet-screen comment tracks as the target bullet-screen comment track of the second bullet-screen comment of the second bullet-screen comment group; or
determine any one of the bullet-screen comment tracks as the target bullet-screen comment track of the first bullet-screen comment of the first bullet-screen comment group or the second bullet-screen comment of the second bullet-screen comment group.

In some embodiments, the bullet-screen comment display parameters include an acceleration movement time point.

Correspondingly, the display module 506 is further configured to:
determine a distance between the first bullet-screen comment and the second bullet-screen comment based on the display position of the second bullet-screen comment in the target bullet-screen comment track and an initial position of the first bullet-screen comment; and
determine the acceleration movement time point of the first bullet-screen comment based on an initial movement speed of the first bullet-screen comment, the distance, and a preset acceleration movement distance.

In some embodiments, the display module 506 further includes:
a determining submodule, configured to: determine whether the distance is less than or equal to a preset distance threshold; and
if an execution result of the determining submodule is that the distance is not less than or equal to the preset distance threshold, determine the acceleration movement time point of the first to-be-displayed bullet-screen comment based on the initial movement speed of the first to-be-displayed bullet-screen comment, the distance, and the preset acceleration movement distance.

In some embodiments, the bullet-screen comment display parameters include a bullet-screen comment collision time point.

Correspondingly, the display module 506 is further configured to:
determine acceleration movement duration of the first bullet-screen comment based on the preset acceleration movement distance and a target movement speed corresponding to acceleration movement; and
determine the bullet-screen comment collision time point of the first bullet-screen comment and the second bullet-screen comment based on the acceleration movement time point and the acceleration movement duration.

In some embodiments, the bullet-screen comment processing apparatus further includes a first processing module, configured to:
display the first bullet-screen comment based on the initial movement speed, and when it is detected that the acceleration movement time point is reached, display the first bullet-screen comment based on the target movement speed; and
when it is detected that the bullet-screen comment collision time point is reached, render and display the first bullet-screen comment based on the preset animation display effect, where the first bullet-screen comment and the second bullet-screen comment of the second bullet-screen comment group move in the target bullet-screen comment track in the opposite directions.

In some embodiments, the bullet-screen comment processing apparatus further includes a second processing module, configured to:
determine a first display time point of the first bullet-screen comment and a second display time point of the second bullet-screen comment in the target bullet-screen comment track;
render and display the first bullet-screen comment based on the bullet-screen comment display parameters;
when it is detected that the bullet-screen comment collision time point is reached and it is determined that a first display time point is earlier than a second display time point, render and display the second bullet-screen comment based on the preset animation display effect; and
when it is detected that a display end time of the second bullet-screen comment is reached, render and display the first bullet-screen comment based on the initial movement speed.

In some embodiments, the bullet-screen comment processing apparatus further includes a first determining module, configured to:
determine whether there is a bullet-screen comment track that does not display a target-type bullet-screen comment of the first bullet-screen comment group or a target-type bullet-screen comment of the second bullet-screen comment group; and
if there is no bullet-screen comment track that does not display a target-type bullet-screen comment of the first bullet-screen comment group or a target-type bullet-screen comment of the second bullet-screen comment group, when it is determined that the first bullet-screen comment and/or the second bullet-screen comment belongs to a target display type, add the first bullet-screen comment and/or the second bullet-screen comment to a waiting queue corresponding to the target display type.

In some embodiments, the bullet-screen comment processing apparatus further includes a second determining module, configured to:
when it is determined that there is a bullet-screen comment track that does not display a target-type bullet-screen comment of the first bullet-screen comment group, determine whether the waiting queue is empty; and
if the waiting queue is not empty, add the first bullet-screen comment in the waiting queue to the bullet-screen comment track for display.

The foregoing describes a schematic solution of the first bullet-screen comment processing apparatus in some embodiments. It should be noted that the technical solution of the first bullet-screen comment processing apparatus and the technical solution of the first bullet-screen comment processing method belong to a same concept. For details not described in detail in the technical solution of the first bullet-screen comment processing apparatus, refer to the descriptions of the technical solution of the first bullet-screen comment processing method.

Figure 6:
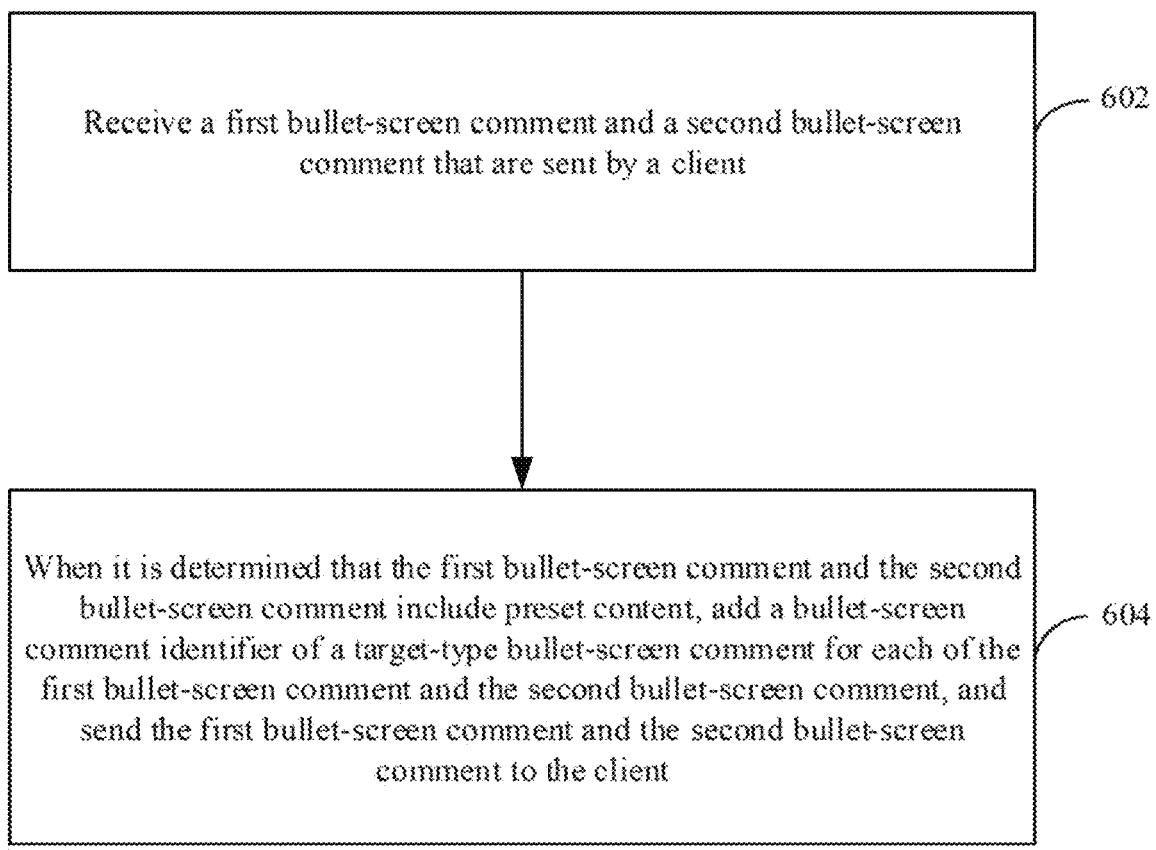
FIG. 6 is a flowchart of a second bullet-screen comment processing method according to some embodiments of this application.

FIG. 6 is a flowchart of a second bullet-screen comment processing method according to some embodiments of this application. The method includes the following steps:

Step 602: Receive a first bullet-screen comment and a second bullet-screen comment that are sent by a client.

Step 604: When it is determined that the first bullet-screen comment and the second bullet-screen comment include preset content, add a bullet-screen comment identifier of a target-type bullet-screen comment for each of the first bullet-screen comment and the second bullet-screen comment, and send the first bullet-screen comment and the second bullet-screen comment to the client, where the target-type bullet-screen comments are bullet-screen comments that are classified based on bullet-screen comment content and that move in opposite directions, the client classifies the first bullet-screen comment into a first bullet-screen comment group and the second bullet-screen comment into a second bullet-screen comment group according to bullet-screen comment content of the first bullet-screen comment and the second bullet-screen comment, and displays the first bullet-screen comment of the first bullet-screen comment group and the second bullet-screen comment of the second bullet-screen comment group by using a target bullet-screen comment track, where the first bullet-screen comment and the second bullet-screen comment move in the target bullet-screen comment track in opposite directions.

In some embodiments, semantic recognition may be further performed on the bullet-screen comment content of the first bullet-screen comment and the second bullet-screen comment.

Bullet-screen comment group classification is performed on the first bullet-screen comment and the second bullet-screen comment based on a semantic recognition result, and the bullet-screen comment identifier of the target-type bullet-screen comment is added for each of the first bullet-screen comment and the second bullet-screen comment based on a classification result.

In some embodiments of this application, when the server determines that the first bullet-screen comment and the second bullet-screen comment that are received by the server include the preset content (group identifiers), the bullet-screen comment identifier of the target-type bullet-screen comment may be added for each of the first bullet-screen comment and the second bullet-screen comment. In this way, when the client determines, based on the bullet-screen comment identifiers, that the first bullet-screen comment and the second bullet-screen comment are the target-type bullet-screen comments, the first bullet-screen comment can be classified into the first bullet-screen comment group and the second bullet-screen comment can be classified into the second bullet-screen comment group based on the bullet-screen comment content of the first bullet-screen comment and the second bullet-screen comment. The first bullet-screen comment of the first bullet-screen comment group and the second bullet-screen comment of the second bullet-screen comment group are displayed by using the target bullet-screen comment track, where the first bullet-screen comment of the first bullet-screen comment group and the second bullet-screen comment of the second bullet-screen comment group move in the target bullet-screen comment track in the opposite directions. Therefore, in the process of displaying the first bullet-screen comment and the second bullet-screen comment, a display manner of the first bullet-screen comment and the second bullet-screen comment in an actual display process is adjusted, thereby implementing different types of bullet-screen comment display effects. This is conducive to meeting bullet-screen comment display or watching requirements of different users, and is conducive to improving video watching experience of the users.

The foregoing describes a schematic solution of the second bullet-screen comment processing method in some embodiments. It should be noted that the technical solution of the second bullet-screen comment processing method and the technical solution of the first bullet-screen comment processing method belong to a same concept. For details not described in detail in the technical solution of the second bullet-screen comment processing method, refer to the descriptions of the technical solution of the first bullet-screen comment processing method.

Figure 7:
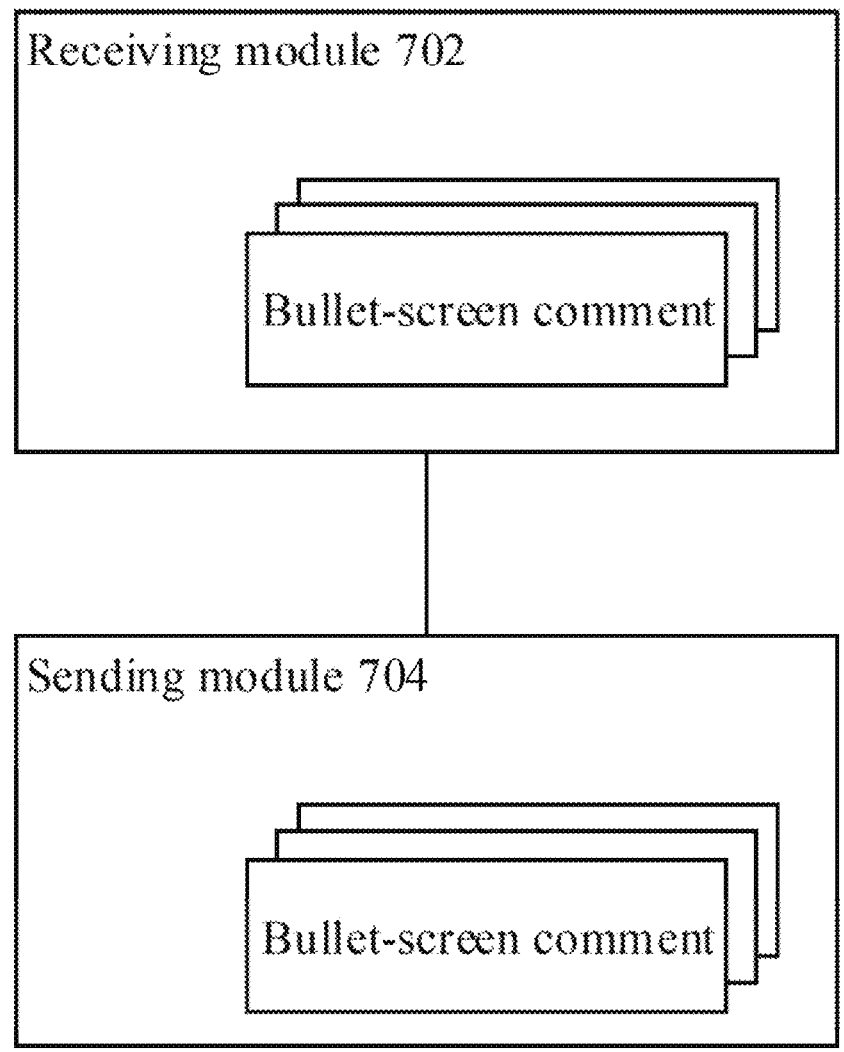
FIG. 7 is a schematic diagram of a structure of a second bullet-screen comment processing apparatus according to some embodiments of this application.

This application further provides a bullet-screen comment processing apparatus embodiment corresponding to the foregoing method embodiments. FIG. 7 is a schematic diagram of a structure of a second bullet-screen comment processing apparatus according to some embodiments of this application. As shown in FIG. 7, the apparatus includes:

a receiving module 702, configured to receive a first bullet-screen comment and a second bullet-screen comment that are sent by a client; and a sending module 704, configured to: when it is determined that the first bullet-screen comment and the second bullet-screen comment include preset content, add a bullet-screen comment identifier of a target-type bullet-screen comment for each of the first bullet-screen comment and the second bullet-screen comment, and send the first bullet-screen comment and the second bullet-screen comment to the client, where the target-type bullet-screen comments are bullet-screen comments that are classified based on bullet-screen comment content and that move in opposite directions, the client classifies the first bullet-screen comment into a first bullet-screen comment group and the second bullet-screen comment into a second bullet-screen comment group according to bullet-screen comment content of the first bullet-screen comment and the second bullet-screen comment, and displays the first bullet-screen comment of the first bullet-screen comment group and the second bullet-screen comment of the second bullet-screen comment group by using a target bullet-screen comment track, where the first bullet-screen comment and the second bullet-screen comment move in the target bullet-screen comment track in opposite directions.

In some embodiments, the bullet-screen comment processing apparatus further includes a recognition module, configured to:

perform semantic recognition on the bullet-screen comment content of the first bullet-screen comment and the second bullet-screen comment; and perform bullet-screen comment group classification on the first bullet-screen comment and the second bullet-screen comment based on a semantic recognition result, and add the bullet-screen comment identifier of the target-type bullet-screen comment for each of the first bullet-screen comment and the second bullet-screen comment based on a classification result.

The foregoing describes a schematic solution of the second bullet-screen comment processing apparatus in some embodiments. It should be noted that the technical solution of the second bullet-screen comment processing apparatus and the technical solution of the second bullet-screen comment processing method belong to a same concept. For details not described in detail in the technical solution of the second bullet-screen comment processing apparatus, refer to the descriptions of the technical solution of the second bullet-screen comment processing method.

Figure 8:
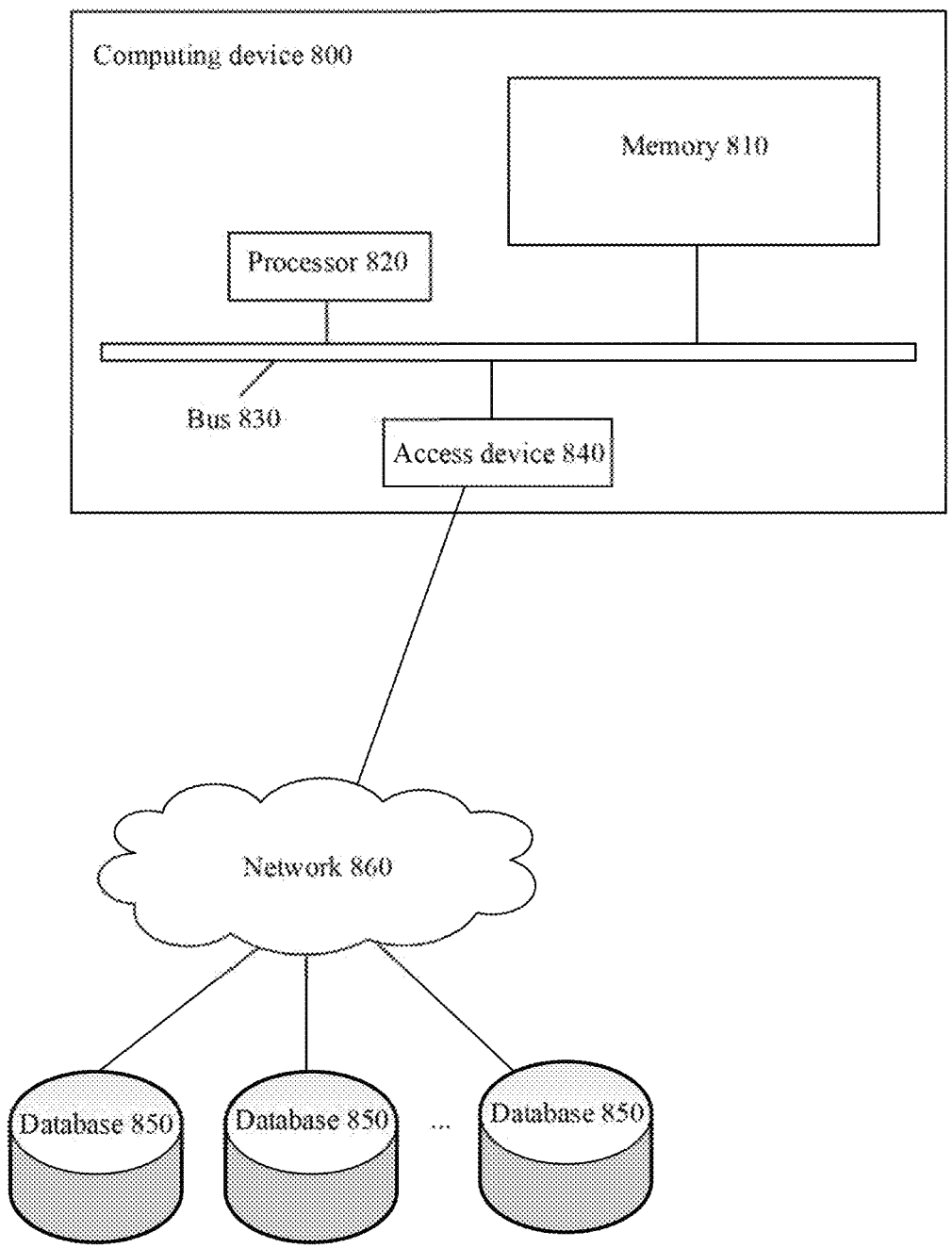
FIG. 8 is a block diagram of a structure of a computing device according to some embodiments of this application.

FIG. 8 is a block diagram of a structure of a computing device 800 according to some embodiments of this specification. Components of the computing device 800 include but are not limited to a memory 810 and a processor 820. The processor 820 and the memory 810 are connected by using a bus 830, and a database 850 is configured to store data.

The computing device 800 further includes an access device 840, and the access device 840 enables the computing device 800 to perform communication by using one or more networks 860. Examples of these networks include a public switched telephone network (PSTN), a local area network (LAN), a wide area network (WAN), a private area network (PAN), or a combination of communication networks such as the Internet. The access device 840 may include one or more of any type of wired or wireless network interface (for example, a network interface card (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, or a near field communication (NFC) interface.

In some embodiments of this application, the foregoing components of the computing device 800 and other components not shown in FIG. 8 may alternatively be connected to each other, for example, by using the bus. It should be understood that the block diagram of the structure of the computing device shown in FIG. 8 is merely used as an example instead of a limitation on the scope of this application. A person skilled in the art may add or replace other components as required.

The computing device 800 may be any type of still or mobile computing device, including a mobile computer or a mobile computing device (for example, a pad, a personal digital assistant, a laptop computer, a notebook computer, or a netbook), a mobile phone (for example, a smartphone), a wearable computing device (for example, a smartwatch or smart glasses) or another type of mobile device, or a still computing device, for example, a desktop computer or a PC. The computing device 800 may alternatively be a mobile or still server.

The processor 820 is configured to execute the following computer-executable instructions. The processor is configured to execute the computer-executable instructions. When the processor executes the computer-executable instructions, the steps of the bullet-screen comment processing method are implemented.

The foregoing describes a schematic solution of the computing device in some embodiments. It should be noted that the technical solution of the computing device and the technical solution of the bullet-screen comment processing method belong to a same concept. For details not described in detail in the technical solution of the computing device, refer to the descriptions of the technical solution of the bullet-screen comment processing method.

Some embodiments of this application further provide a computer-readable storage medium, where the computer-readable storage medium stores computer-executable instructions. When the instructions are executed by a processor, the steps of the bullet-screen comment processing method are implemented.

The foregoing describes a schematic solution of the computer-readable storage medium in some embodiments. It should be noted that the technical solution of the storage medium and the technical solution of the bullet-screen comment processing method belong to a same concept. For details not described in detail in the technical solution of the storage medium, refer to the descriptions of the technical solution of the bullet-screen comment processing method.

Specific embodiments of this application are described above. Other embodiments fall within the scope of the appended claims. In some cases, the actions or steps recorded in the claims can be performed in a sequence different from the sequence in embodiments and the desired results can still be achieved. In addition, the process depicted in the accompanying drawings does not necessarily require the shown particular sequence or consecutive sequence to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that embodiments of this application are not limited to the described action sequence, because according to embodiments of this application, some steps may be performed in another sequence or simultaneously. In addition, a person skilled in the art should also understand that the described embodiments in this specification are all embodiments, and involved actions and modules are not necessarily mandatory to embodiments of this application.

In the foregoing embodiments, descriptions of the embodiments have respective focuses. For a part that is not described in detail in some embodiments, refer to related descriptions in other embodiments.

The embodiments of this application disclosed above are merely intended to help describe this application. In the embodiments, not all details are described in detail, and this application is not limited to only the specific implementations. Clearly, many modifications and changes may be made based on the content of embodiments of this application. These embodiments are selected and specifically described in this application to better explain the principle and the actual applications of embodiments of this application, so that a person skilled in the art can better understand and use this application. This application is limited to only the claims and the scope and equivalents thereof.

What is claimed is:

1. A method, comprising:
receiving a first bullet-screen comment and a second bullet-screen comment, wherein the first bullet-screen comment and the second bullet-screen comment are comment texts formed by users in a process of watching a video;
classifying the first bullet-screen comment into a first bullet-screen comment group and classifying the second bullet-screen comment into a second bullet-screen comment group based on bullet-screen comment content of the first bullet-screen comment and the second bullet-screen comment; and
displaying the first bullet-screen comment of the first bullet-screen comment group and the second bullet-screen comment of the second bullet-screen comment group by using a target bullet-screen comment track, wherein the first bullet-screen comment of the first bullet-screen comment group and the second bullet-screen comment of the second bullet-screen comment group move in the target bullet-screen comment track in opposite directions, wherein after the receiving the first bullet-screen comment and the second bullet-screen comment the method further comprises:
  determining whether there is a bullet-screen comment track that does not display a target-type bullet-screen comment of the first bullet-screen comment group or a target-type bullet-screen comment of the second bullet-screen comment group; and
  in response to determining that there is no bullet-screen comment track that does not display a target-type bullet-screen comment of the first bullet-screen comment group or a target-type bullet-screen comment of the second bullet-screen comment group;
  in response to determining that at least one of the first bullet-screen comment and the second bullet-screen comment belongs to a target display type, adding at least one of the first bullet-screen comment and the second bullet-screen comment to a waiting queue corresponding to the target display type.

2. The method according to claim 1, further comprising:
  in response to detecting that a distance between the first bullet-screen comment of the first bullet-screen comment group and the second bullet-screen comment of the second bullet-screen comment group in the target bullet-screen comment track is less than a preset distance threshold, rendering and displaying at least one of the first bullet-screen comment and the second bullet-screen comment based on a preset animation display effect.

3. The method according to claim 1, wherein the displaying the first bullet-screen comment of the first bullet-screen comment group and the second bullet-screen comment of the second bullet-screen comment group by using the target bullet-screen comment track comprises:
  determining the target bullet-screen comment track of the first bullet-screen comment of the first bullet-screen comment group and the second bullet-screen comment of the second bullet-screen comment group;
  displaying the second bullet-screen comment by using the target bullet-screen comment track;
  determining bullet-screen comment display parameters of the first bullet-screen comment based on a display position of the second bullet-screen comment in the target bullet-screen comment track; and
  rendering and displaying the first bullet-screen comment based on the bullet-screen comment display parameters and a preset animation display effect.

4. The method according to claim 3, wherein the determining the target bullet-screen comment track of the first bullet-screen comment of the first bullet-screen comment group and the second bullet-screen comment of the second bullet-screen comment group comprises:
  determining bullet-screen comment tracks that do not display a target-type bullet-screen comment of the first bullet-screen comment group;
  determining any bullet-screen comment track that is in the bullet-screen comment tracks and that displays a target-type bullet-screen comment of the second bullet-screen comment group as the target bullet-screen comment track of the first bullet-screen comment of the first bullet-screen comment group;
  determining bullet-screen comment tracks that do not display the target-type bullet-screen comment of the second bullet-screen comment group; and
  determining any one of the bullet-screen comment tracks as the target bullet-screen comment track of the second bullet-screen comment of the second bullet-screen comment group; or
  determining any one of the bullet-screen comment tracks as the target bullet-screen comment track of the first bullet-screen comment of the first bullet-screen comment group or the second bullet-screen comment of the second bullet-screen comment group.

5. The method according to claim 3, wherein the bullet-screen comment display parameters comprise an acceleration movement time point; and
  the determining bullet-screen comment display parameters of the first bullet-screen comment based on the display position of the second bullet-screen comment in the target bullet-screen comment track correspondingly comprises:
  determining a distance between the first bullet-screen comment and the second bullet-screen comment based on the display position of the second bullet-screen comment in the target bullet-screen comment track and an initial position of the first bullet-screen comment; and
  determining the acceleration movement time point of the first bullet-screen comment based on an initial movement speed of the first bullet-screen comment, the distance, and a preset acceleration movement distance.

6. The method according to claim 5, after the determining a distance between the first bullet-screen comment and the second bullet-screen comment, further comprising:
  determining whether the distance is less than or equal to a preset distance threshold; and
  in response to determining that the distance is not less than or equal to the preset distance threshold, performing the step of determining the acceleration movement time point of the first bullet-screen comment based on an initial movement speed of the first bullet-screen comment, the distance, and a preset acceleration movement distance.

7. The method according to claim 5, wherein the bullet-screen comment display parameters comprise a bullet-screen comment collision time point; and
  the determining the bullet-screen comment display parameters of the first bullet-screen comment based on the display position of the second bullet-screen comment in the target bullet-screen comment track correspondingly comprises:
  determining acceleration movement duration of the first bullet-screen comment based on the preset acceleration movement distance and a target movement speed corresponding to acceleration movement; and
  determining the bullet-screen comment collision time point of the first bullet-screen comment and the second bullet-screen comment based on the acceleration movement time point and the acceleration movement duration.

8. The method according to claim 7, further comprising:
  displaying the first bullet-screen comment based on the initial movement speed, and in response to detecting that the acceleration movement time point is reached, displaying the first bullet-screen comment based on the target movement speed; and
  in response to detecting that the bullet-screen comment collision time point is reached, rendering and displaying the first bullet-screen comment based on the preset animation display effect, wherein the first bullet-screen comment and the second bullet-screen comment of the second bullet-screen comment group move in the target bullet-screen comment track in the opposite directions.

9. The method according to claim 7, further comprising:
determining a first display time point of the first bullet-screen comment and a second display time point of the second bullet-screen comment in the target bullet-screen comment track;
rendering and displaying the first bullet-screen comment based on the bullet-screen comment display parameters;
in response to detecting that the bullet-screen comment collision time point is reached and determining that a first display time point is earlier than a second display time point, rendering and displaying the second bullet-screen comment based on the preset animation display effect; and
in response to detecting that a display end time of the second bullet-screen comment is reached, rendering and displaying the first bullet-screen comment based on the initial movement speed.

10. The method according to claim 1, further comprising:
in response to determining that there is a bullet-screen comment track that does not display a target-type bullet-screen comment of the first bullet-screen comment group, determining whether the waiting queue is empty; and
in response to determining that the waiting queue is not empty, adding the first bullet-screen comment in the waiting queue to the bullet-screen comment track for display.

11. The method according to claim 1, wherein the first bullet-screen comment and the second bullet-screen comment are received from a server, and wherein each of the first bullet-screen comment and the second bullet-screen comment is added by the server with a bullet-screen comment identifier of a target-type bullet-screen comment.

12. The method according to claim 11, wherein each of the first bullet-screen comment and the second bullet-screen comment is added by the server with the bullet-screen comment identifier of the target-type bullet-screen comment by following operations:
performing semantic recognition on a bullet-screen comment content of the first bullet-screen comment and the second bullet-screen comment; and
performing bullet-screen comment group classification on the first bullet-screen comment and the second bullet-screen comment based on a semantic recognition result, and adding the bullet-screen comment identifier of the target-type bullet-screen comment for each of the first bullet-screen comment and the second bullet-screen comment based on a classification result.

13. A computing device, comprising:
one or more processors; and
a memory, storing one or more programs configured to be executed by the one or more processors, the one or more programs comprising instructions for:
receiving a first bullet-screen comment and a second bullet-screen comment, wherein the first bullet-screen comment and the second bullet-screen comment are comment texts formed by users in a process of watching a video;
classifying the first bullet-screen comment into a first bullet-screen comment group and classifying the second bullet-screen comment into a second bullet-screen comment group based on bullet-screen comment content of the first bullet-screen comment and the second bullet-screen comment; and
displaying the first bullet-screen comment of the first bullet-screen comment group and the second bullet-screen comment of the second bullet-screen comment group by using a target bullet-screen comment track, wherein the first bullet-screen comment of the first bullet-screen comment group and the second bullet-screen comment of the second bullet-screen comment group move in the target bullet-screen comment track in opposite directions,
wherein after the receiving the first bullet-screen comment and the second bullet-screen comment, the one or more programs further comprises instructions for:
determining whether there is a bullet-screen comment track that does not display a target-type bullet-screen comment of the first bullet-screen comment group or a target-type bullet-screen comment of the second bullet-screen comment group; and
in response to determining that there is no bullet-screen comment track that does not display a target-type bullet-screen comment of the first bullet-screen comment group or a target-type bullet-screen comment of the second bullet-screen comment group;
in response to determining that at least one of the first bullet-screen comment and the second bullet-screen comment belongs to a target display type, adding least one of the first bullet-screen comment and the second bullet-screen comment waiting responding to the target display type.

14. The computing device according to claim 13, further comprising:
in response to detecting that a distance between the first bullet-screen comment of the first bullet-screen comment group and the second bullet-screen comment of the second bullet-screen comment group in the target bullet-screen comment track is less than a preset distance threshold, rendering and displaying at least one of the first bullet-screen comment and the second bullet-screen comment based on a preset animation display effect.

15. The computing device according to claim 13, wherein the displaying the first bullet-screen comment of the first bullet-screen comment group and the second bullet-screen comment of the second bullet-screen comment group by using the target bullet-screen comment track comprises:
determining the target bullet-screen comment track of the first bullet-screen comment of the first bullet-screen comment group and the second bullet-screen comment of the second bullet-screen comment group;
displaying the second bullet-screen comment by using the target bullet-screen comment track;
determining bullet-screen comment display parameters of the first bullet-screen comment based on a display position of the second bullet-screen comment in the target bullet-screen comment track; and
rendering and displaying the first bullet-screen comment based on the bullet-screen comment display parameters and a preset animation display effect.

16. The computing device according to claim 15, wherein the determining the target bullet-screen comment track of the first bullet-screen comment of the first bullet-screen comment group and the second bullet-screen comment of the second bullet-screen comment group comprises:
determining bullet-screen comment tracks that do not display a target-type bullet-screen comment of the first bullet-screen comment group;
determining any bullet-screen comment track that is in the bullet-screen comment tracks and that displays a target-type bullet-screen comment of the second bullet-screen comment group as the target bullet-screen comment track of the first bullet-screen comment of the first bullet-screen comment group;

determining bullet-screen comment tracks that do not display the target-type bullet-screen comment of the second bullet-screen comment group; and determining any one of the bullet-screen comment tracks as the target bullet-screen comment track of the second bullet-screen comment of the second bullet-screen comment group; or determining any one of the bullet-screen comment tracks as the target bullet-screen comment track of the first bullet-screen comment of the first bullet-screen comment group or the second bullet-screen comment of the second bullet-screen comment group.

17. The computing device according to claim 15, wherein the bullet-screen comment display parameters comprise an acceleration movement time point; and the determining bullet-screen comment display parameters of the first bullet-screen comment based on the display position of the second bullet-screen comment in the target bullet-screen comment track correspondingly comprises:

determining a distance between the first bullet-screen comment and the second bullet-screen comment based on the display position of the second bullet-screen comment in the target bullet-screen comment track and an initial position of the first bullet-screen comment; and determining the acceleration movement time point of the first bullet-screen comment based on an initial movement speed of the first bullet-screen comment, the distance, and a preset acceleration movement distance.

18. The computing device according to claim 17, after the determining a distance between the first bullet-screen comment and the second bullet-screen comment, further comprising:

determining whether the distance is less than or equal to a preset distance threshold; and in response to determining that the distance is not less than or equal to the preset distance threshold, performing the step of determining the acceleration movement time point of the first bullet-screen comment based on an initial movement speed of the first bullet-screen comment, the distance, and a preset acceleration movement distance.

19. A non-transitory computer-readable storage medium, wherein the non-transitory computer-readable storage medium stores one or more programs comprising instructions that, when executed by one or more processors of a computing device, cause the computing device to perform operations comprising:

receiving a first bullet-screen comment and a second bullet-screen comment, wherein the first bullet-screen comment and the second bullet-screen comment are comment texts formed by users in a process of watching a video;

classifying the first bullet-screen comment into a first bullet-screen comment group and classifying the second bullet-screen comment into a second bullet-screen comment group based on bullet-screen comment content of the first bullet-screen comment and the second bullet-screen comment; and displaying the first bullet-screen comment of the first bullet-screen comment group and the second bullet-screen comment of the second bullet-screen comment group by using a target bullet-screen comment track, wherein the first bullet-screen comment of the first bullet-screen comment group and the second bullet-screen comment of the second bullet-screen comment group move in the target bullet-screen comment track in opposite directions, wherein after the receiving the first bullet-screen comment and the second bullet-screen comment, the operations further comprise:

determining whether there is a bullet-screen comment track that does not display a target-type bullet-screen comment of the first bullet-screen comment group or a target-type bullet-screen comment of the second bullet-screen comment group; and in response to determining that there is no bullet-screen comment track that does not display a target-type bullet-screen comment of the first bullet-screen comment group or a target-type bullet-screen comment of the second bullet-screen comment group;

in response to determining that at least one of the first bullet-screen comment and the second bullet-screen comment belongs to a target display type adding at least one of the first bullet-screen comment and the second bullet-screen comment to a waiting queue corresponding to the target display type.

\* \* \* \* \*